(12) United States Patent
Sato et al.

(10) Patent No.: US 8,672,379 B2
(45) Date of Patent: Mar. 18, 2014

(54) GRIPPING DEVICE

(75) Inventors: Takeshi Sato, Chiba (JP); Takeshi Yasooka, Yamato (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 0 days.

(21) Appl. No.: 13/704,274

(22) PCT Filed: Jun. 15, 2011

(86) PCT No.: PCT/JP2011/063708
§ 371 (c)(1),
(2), (4) Date: Mar. 6, 2013

(87) PCT Pub. No.: WO2011/158866
PCT Pub. Date: Dec. 22, 2011

(65) Prior Publication Data
US 2013/0099517 A1    Apr. 25, 2013

(30) Foreign Application Priority Data

Jun. 17, 2010    (JP) ................................ 2010-138340

(51) Int. Cl.
*B25J 15/02* (2006.01)
(52) U.S. Cl.
USPC ............................ 294/198; 294/192; 294/106
(58) Field of Classification Search
USPC ............. 294/198, 106, 902, 192, 86.4, 87.22, 294/119; 269/249, 143, 3, 6, 43; 414/729, 414/732; 901/31, 36–37, 39; 254/18, 22, 24
See application file for complete search history.

(56) References Cited

U.S. PATENT DOCUMENTS

| | | | | |
|---|---|---|---|---|
| 3,039,812 A | * | 6/1962 | Nimeskern | 294/198 |
| 3,714,870 A | * | 2/1973 | Blatt | 92/140 |
| 3,902,614 A | * | 9/1975 | Roberts et al. | 414/735 |
| 5,819,386 A | * | 10/1998 | Koppe | 29/261 |

FOREIGN PATENT DOCUMENTS

| | | |
|---|---|---|
| JP | 53-045864 U | 4/1978 |
| JP | 04-002485 | 1/1992 |
| JP | 04-300189 | 10/1992 |
| JP | 2010-138340 | 6/2010 |

* cited by examiner

*Primary Examiner* — Stephen Vu
(74) *Attorney, Agent, or Firm* — Young Basile

(57) ABSTRACT

The gripping device is provided with a rod portion which is movable vertically along a rod axis, to the lower end is mounted a connecting block. A pair of opening and closing lever portions is disposed to face each other along the direction of a fore-to-aft or lateral axis, with intermediate portions which are pivotal about a fulcrum support shaft portion parallel to a left-right or longitudinal axis. A link mechanism connects the connecting block and the upper ends of the pair of the opening and closing lever portions and pivots the pair of the opening and closing lever portions in the direction of the fore-to-aft axis in response to the vertical movement of the rod portion. The pair of the opening and closing lever portions is formed with a cutout or notch at least extending from the intermediate portions to upper ends and is disposed against each other with the rod portion.

4 Claims, 8 Drawing Sheets

GRIPPING DEVICE

TECHNICAL FIELD

The present invention relates in general to a gripping device for holding or gripping a work piece, and in particular relates to a gripping device of a toggle type.

BACKGROUND

When performing inspection or assembly and the like on a variety of products, a conventional gripping device has been used to hold or grip work pieces in order to transport or handle the work pieces. The gripping devices have different shapes and sizes depending on the specification of the work piece, and, in general, have a pair of opening and closing lever portions so as to be configured to grip and pluck the work piece using this opening and closing levers.

In the gripping device of this type, such a device with a toggle mechanism is known in which a work piece may be gripped with greater force (gripping force) than the input force to operate a pair of opening and closing lever portions. This toggle mechanism is regarded as a servo or booster mechanism which is capable of increasing the output force larger than the input force.

Gripping devices of a toggle-type like this with a robot hand have been described in Japanese Utility Model Application Publication JP-U-59-160184 A and Japanese Patent Application Publication; JP 2008-364981. This robot hand is mainly comprised of a vertically movable rod portion, an operation piece mounted in the lower end of the rod portion, a pair of connecting levers, one end of each of which is connected to the operation piece through a pin or shaft so as to be rotatable about that end, and a pair of opening and closing lever portions, the upper end of each being rotatably connected to the other end of the pair of connecting lever portions via a pin or shaft.

The pair of opening and closing lever portions is linked at the intermediate location thereof to a case body or housing through a pin or shaft and is made rotatable about this connecting location. In addition, the lower ends of the pair of opening and closing lever portions has a role to act as the claw portion for gripping the sides of the work piece. In addition, the pair of opening and closing lever portions is disposed to face each other with the rod portion and the operation piece interposed, i.e., outwardly of the side of rod portion and operating piece. The pair of opening and closing lever portions is supposed to be set in the open state by rotating, with both upper ends approaching while both lower ends are spaced apart in response to the rod portion being moved downwardly.

When gripping a work piece using a robot hand that is configured in this manner, the rod is moved upward. Then, since the operation piece also moves upward, the pair of connecting levers moves upward while rotating so as to push the upper portions of the pair of opening and closing levers outwardly. Thus, the pair of opening and closing lever portions rotates about the intermediate portion as a support point and begins to close so that the lower ends will be close to each other. As a result, the work piece may be gripped by sandwiching the work piece from both sides. Specifically, since a pair of opening and closing lever portions is configured to open and close by using a toggle mechanism, a work piece may be gripped reliably in a large gripping force.

BRIEF SUMMARY

However, in the gripping device of the above-mentioned conventional toggle type, a pair of opening and closing lever portions faces each other with a rod portion and operation piece deposing in between lever portions, and consequently disposed outward of both sides of these rod portion and operation piece. Therefore, a gap between the pair of opening and closing lever portions tends to widen, and it has been difficult to achieve a further miniaturization to decrease the width of the overall gripping device along the opening and closing direction.

In particular, a pair of opening and closing lever portions is tilted in the open state with respect to the rod such that the upper ends approach and the lower ends are spaced apart from each other. Therefore, in a standby state in which a pair of opening and closing lever portions is held open, the widthwise size tends to be large.

The present invention has been made in consideration of such circumstances, and its purpose is to provide a gripping device of the toggle type that may reduce a pair of opening and closing lever portions along the opening and closing direction for use in small space.

The gripping device according to the embodiments disclosed herein is directed to a gripping device for gripping a work piece by clamping or gripping the work piece on both sides, wherein a rod portion is movable vertically along a rod axis to a lower end of which a connecting block is mounted. A pair of opening and closing lever sections is disposed to face each other along a left-right axis perpendicular to the rod axis. The lever portions are supported by a fulcrum axis at the intermediate portion thereof, and both an upper end and lower end thereof are adapted to pivot in the left-right direction about the fulcrum axis disposed parallel to a fore-to-aft axis or shaft which is perpendicular to both the rod axis and the left-right axis. A link mechanism is provided which connects the connecting block and the upper ends of the opening and closing lever sections and allows the lower ends of the opening and closing lever portions to pivot in the left-right direction so that the lower ends of the opening and closing levers move farther apart or come closer to each other in response to vertical movement of the rod portion. The opening and closing lever portions are formed with a cutout portion at least at a portion extending from the intermediate portion to the upper end, and the pair of opening and closing lever portions is disposed to face each other in a state in which the rod portion and the connecting block are stored within the cutout portion. The upper ends are disposed on both sides of the rod portion and connecting block portion along the fore-to-aft axis.

In the gripping device disclosed herein, when moving the rod along the rod axis vertically, the connecting block also moves up and down in response thereto. Then, with the vertical movement of the connecting block, the link mechanism moves the upper ends of the pair of opening and closing lever portions so as to pull or push these opening and closing lever portions in the direction of the left-right axis. In this instance, since the pair of opening and closing lever portions is at their intermediate portions pivotally supported (i.e., supported so as to be capable of rotation) on the fulcrum shaft portion, upper end and lower end are rotated in the opposite direction to each other about the fulcrum shaft. Therefore, by moving to push or pull the upper end of the opening and closing lever portions, the lower ends can be separated or close to each other. By utilizing the pair of lower ends of the opening and closing levers, the sides of work piece may be sandwiched to grip, it is possible to grip a work piece on both sides thereof and release the work piece by using a pair of opening and closing lever portions.

Although the pair of opening and closing lever portions is disposed to face each other along the left-right axis, they are not disposed outside of both sides of the connecting block with a distance, but, instead, are disposed to face each other with the rod portion and connecting block stored or accommodated within a cutout or notch. Therefore, without being affected by the rod portion and the connecting block, it is possible for the pair of the opening and closing levers to confront while being close enough to each other.

In this case, the upper ends of the pair of opening and closing lever portions is located on both sides of the rod portion and the connecting block along the fore-to-aft axis direction. Therefore, since the upper ends of the opening and closing lever portion will be totally free of interference, a proper operation of the opening and closing lever will be conducted reliably.

In particular, because the pair of opening and closing lever portions can confront along the direction of left-right axis while being as close as possible, the width of the entire device along the direction (left-right axis) may be reduced for miniaturization. Therefore, it is possible to install in small spaces, and the gripping device with excellent ease of use and convenience may be obtained.

The gripping device of the embodiments disclosed herein includes a first connecting pin protruding along the fore-to-aft axis from the opposing surfaces, each being faced with the upper portion of the lever. A second connecting pin protrudes from the upper end of the pair of lever portions along the fore-to-aft axis, and a link piece has one end rotatably mounted to the first connecting pin while with the other end is rotatably mounted to the second connecting pin for establishing a linkage between the connecting block and the pair of opening and closing lever portions.

When the connecting block moves up and down along with the rod portion, the first connecting pin also moves up and down. Then, one end of the link piece moves up and down along the rod axis, the other end rotates around the first connecting pin vertically. Consequently, the upper ends of the pair of opening and closing lever portions linked to the link piece via the second connecting pin move to be attracted or pushed to spread toward the left-right axis. Therefore, the pair of opening and closing lever portions may be pivoted in the left-right axis direction about the fulcrum shaft portion to have the lower ends come closer or separate further. As a result, it is possible to grip a work piece and to release the gripped work piece by utilizing the lower ends.

In particular, since the link mechanism is configured by a simplified combination of the first connecting pin, the second connecting pin and the link piece, it is possible to reduce the number of parts and to suppress the high cost with an aim to simplify the configuration.

The gripping device is further characterized in that the first connecting pins are separated by the same distance in the opposite directions from the rod axis on the opposing surface along the left-right axis so that the first connecting pins are spaced apart in the left-right direction and the center axes are disposed not coaxial to each other.

Since the first connecting pins, each formed on the opposing surface of connecting block, are shifted to each other in the left-right direction with an open distance, when the upper ends of the opening and closing lever portions are linked through link piece, the respective upper ends may be crossed so that the pair of opening and closing lever portions may face each other in a closer state.

Therefore, the overall width of the device along the opening and closing direction (left-right direction) may be made more compact to further reduce the size.

The gripping device is further characterized by a biasing member which urges or biases the rod portion along the rod axis so that the rod will be moved in order for the lower ends of the pair of the opening and closing lever portions to come closer to each other.

While gripping the work piece, even if means for vertically moving the rod section is temporarily inoperative, the biasing member urges the rod portion in order for the lower ends of a pair of opening and closing lever portions to come closer. Therefore, it is possible to precautiously prevent an inadvertent release of grip of work piece and its fall with an increased level of reliability in a gripping device.

The gripping device can further comprise a case or housing at least enclosing from around the connecting block and the link mechanism. The opening and closing lever portions are connected to the case through the fulcrum shaft and the upper ends are housed inside the case while the lower ends exposed outside of the case.

The upper ends of a pair of the opening and closing lever portions, connecting block, link mechanism and the like as components for opening and closing movements of the opening and closing lever portions are enclosed by a case. Therefore, they are less susceptible to direct contact from outside and dust is less likely to adhere. Therefore, it is easy to maintain the reliability of operation over the long term, and to ensure easy gripping of the work piece.

Due to the gripping devices disclosed herein, it is possible to reduce the width of a pair of the opening and closing lever portions along the direction of opening and closing, and the device may be set up in small spaces. Moreover, because of the structure to open and close the pair of opening and closing lever portions using a toggle mechanism (a toggle-type), work piece can reliably gripped with sufficient force despite the small size and the function of gripping device will be fully exhibited.

BRIEF DESCRIPTION OF THE DRAWINGS

The description herein makes reference to the accompanying drawings wherein like reference numerals refer to like parts throughout the several views, and wherein.

DETAILED DESCRIPTION

The embodiments of gripping device disclosed herein will now explained below with reference to FIGS. 1 to 8.

Figure 1:
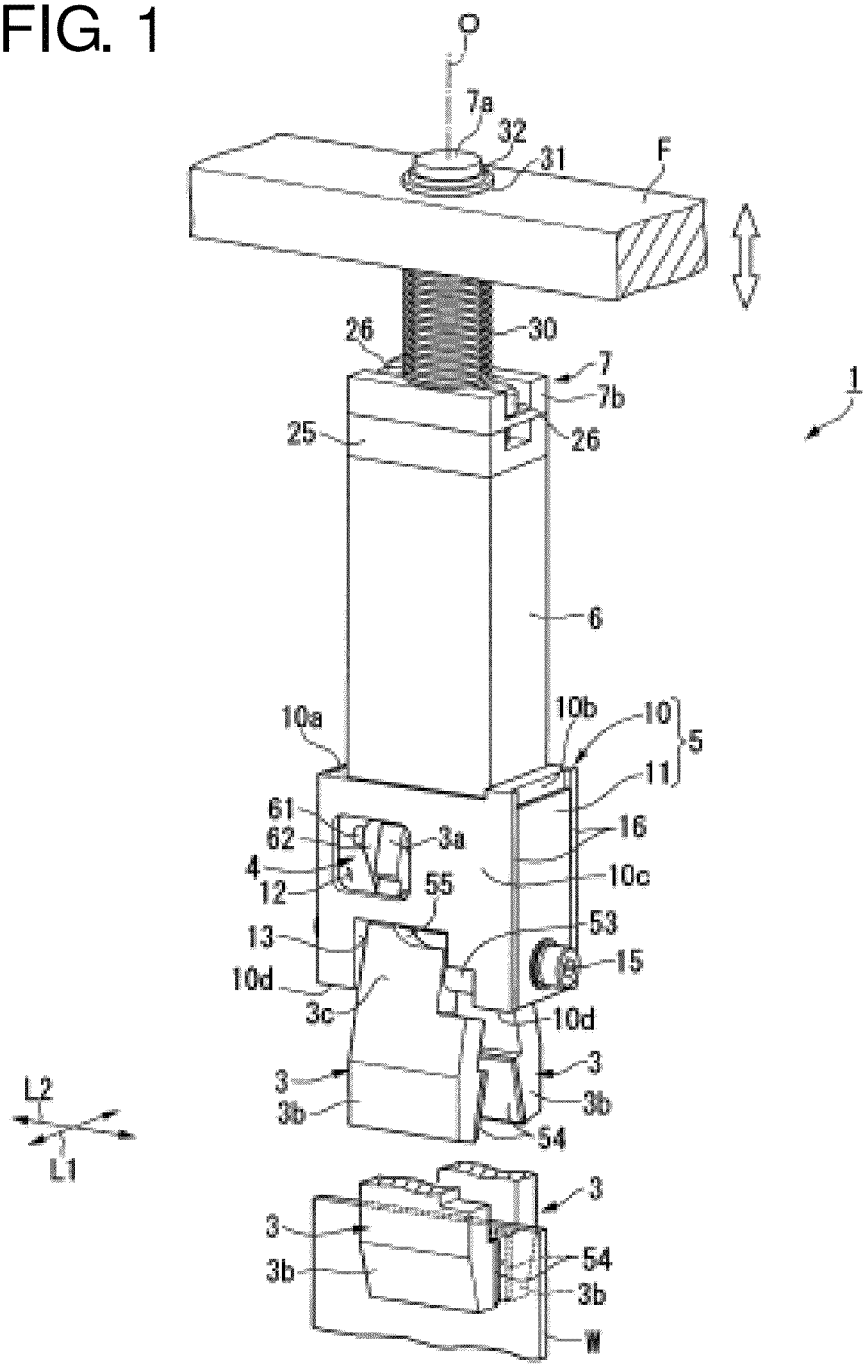
FIG. 1 is a perspective view of the entire gripping device according to the present invention.

A gripping device holds or grips a work piece W by gripping both sides as shown in FIG. 1, and is attached and suspended to a moving frame F which is movable upward and downward by driving means (not shown). In addition, by the movement of the movable frame F, a gripping device can be spaced closer to the work piece W. FIG. 1 is a perspective view of the whole appearance of a gripping device.

It should be noted that not only the upward/downward movements of movable frame F, the frame may also be configured to move horizontally. By doing this, simultaneously with gripping of the work piece W in a gripping device, the conveyance of said work piece (W) may be possible. Further, the present embodiment will be described as an example of a planar work piece W, as a non-limiting example. In addition, as a flat plate-shaped work piece (W), PCB, semiconductor substrate, LCD panel, glass substrate and various battery components may be contemplated.

A gripping device as shown in FIGS. 1 through 4 is mainly composed of a rod portion 2 movable in a vertical direction along a rod axis (O), a pair of opening and closing lever portions 3 to grip or hold a work piece W on both sides, a link mechanism 4 to establish a linkage between the rod portion 2 and the pair of opening and closing lever portions 3, a case body (housing) 5 for housing the link mechanism 4 inside, cylinder case 6 connected to the top of this case body 5, and a coupling tube or cylinder connected to the top of cylinder case 6 and mounted to movable frame F.

Figure 2:
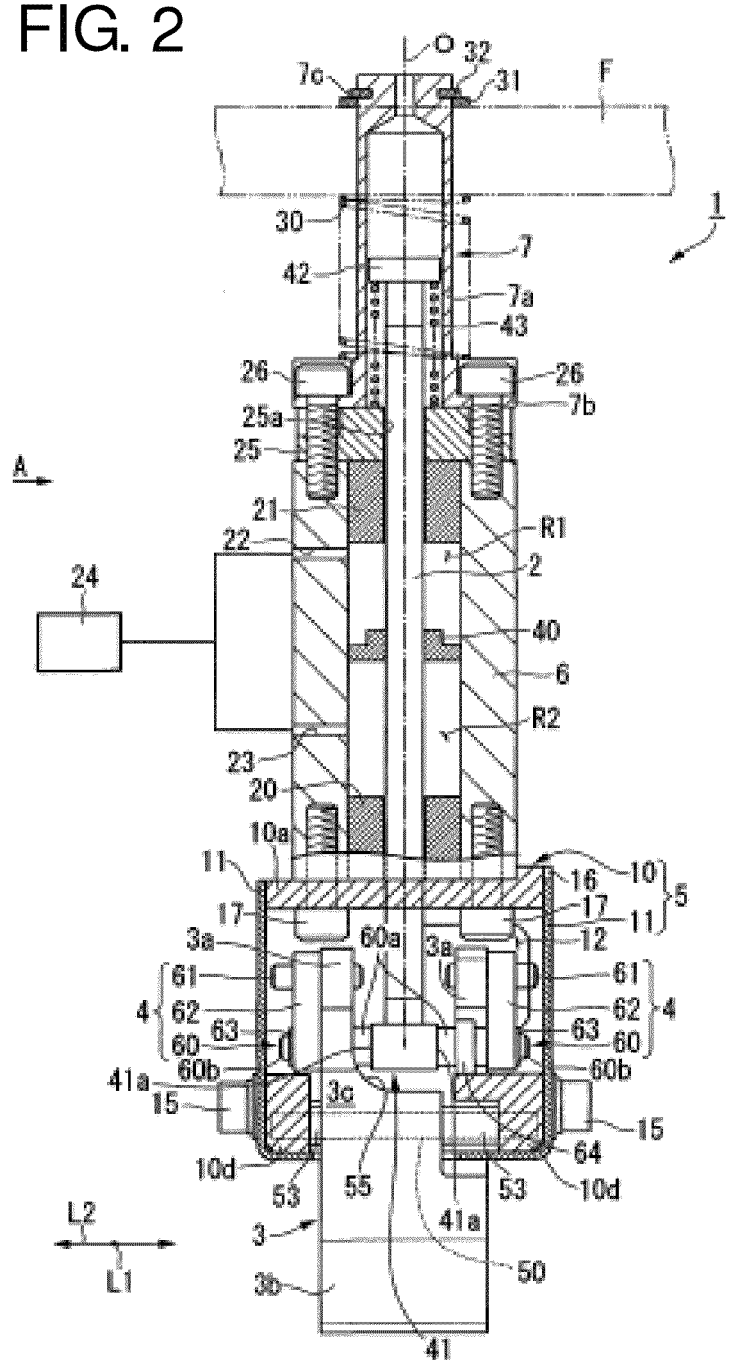
FIG. 2 is a longitudinal sectional view of the gripping device shown in FIG. 1.
Figure 3:
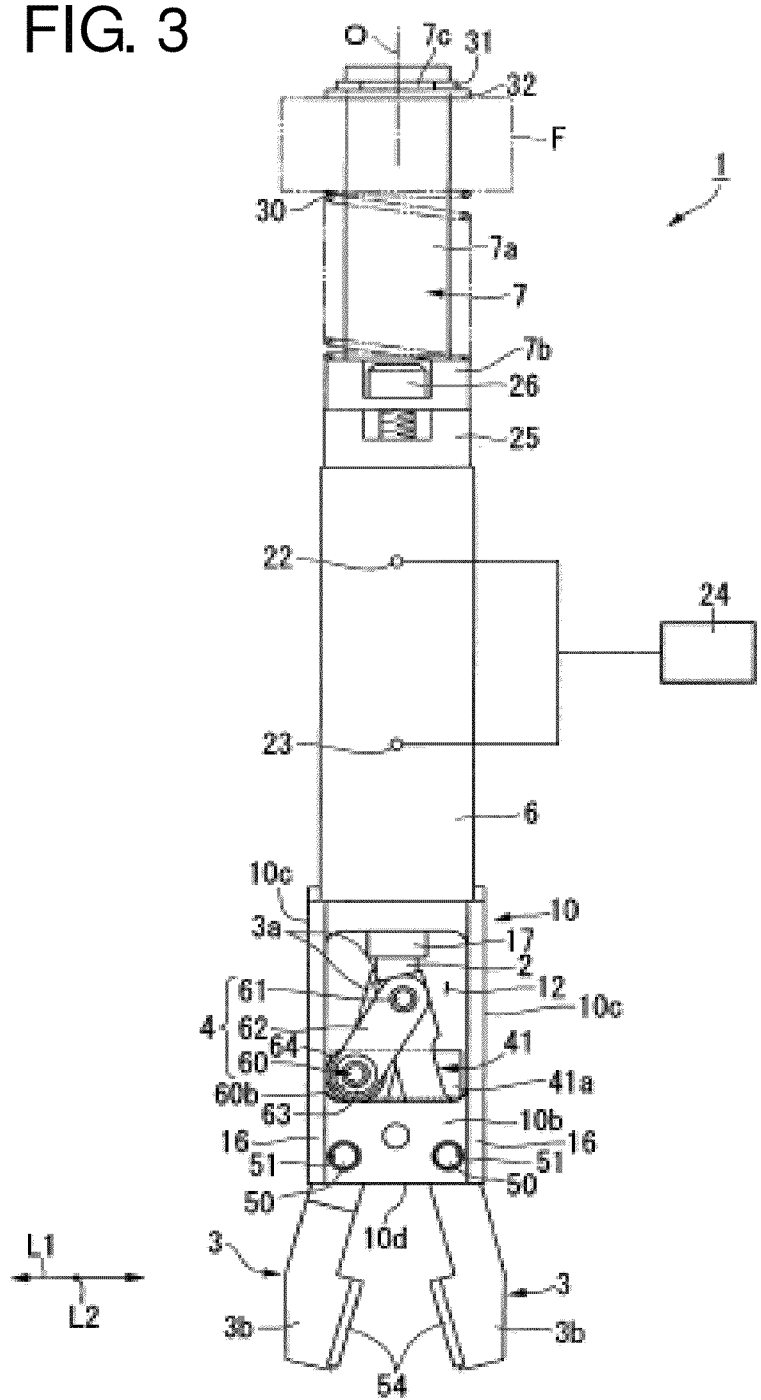
FIG. 3 is a side view of the gripping device as seen from the direction of the arrow A shown in FIG. 2, with a case lid removed.
Figure 4:
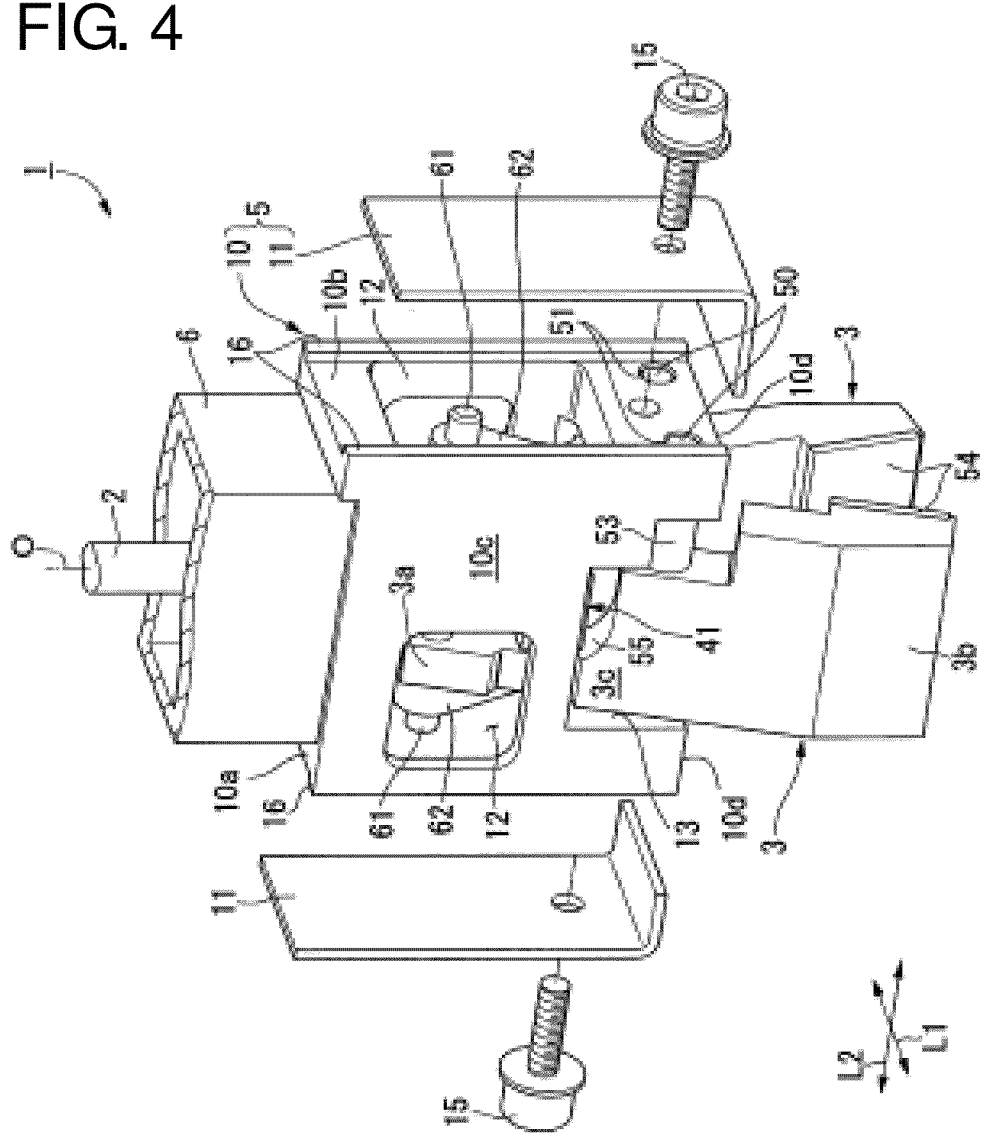
FIG. 4 is a perspective, enlarged area view around the opening and closing lever portions of gripping device shown in FIG. 1.

In addition, FIG. 2 is a longitudinal sectional view of a gripping device shown in FIG. 1. FIG. 3 is a side view of a gripping device as seen from the direction of the arrow A shown in FIG. 2 with case lid 11 removed. FIG. 4 is an enlarged perspective view of the area surrounding the opening and closing lever portions 3 shown in FIG. 1.

In addition, in this embodiment, the direction perpendicular to rod axis O, and along which a pair of opening and closing lever portions 3 face to each other is defined as a left-right or left-right axis L1, while the direction perpendicular to both the rod axis O and the left-right axis L1 is defined as a fore-to-aft axis L2.

First, description is made of case body 5. This case body 5 is composed of a box of rectangular parallelepiped shape 11 and is formed with a case body 10 in which an accommodating space is secured and a L-shaped case lid 11 to be detachably attached to the case body 10.

The case body 10 is formed into a box-shape by machining, shaving and the like of a block of resin or metal, for example, and can surround a circumference around and accommodate inside a connecting block 41, link mechanism 4 and the upper ends 3a opening and closing lever portions 3 and the like so as to protect them.

In the central part of the top or ceiling wall portion 10a of the case body 10, an insertion hole (not shown) is formed for insertion of the rod portion 2. In addition, the front and rear wall portions 10b of the case body 10 are perpendicular to the direction of fore-to-aft axis or longitudinal axis L2 and are formed with an access opening 12 for performing the assembly operations inside of the case body 10.

Likewise, left and right wall portions 10c of the case body 10 are perpendicular to the direction of left-right axis L1 and are formed with another access opening 12 for performing assembly. In addition, the left and right wall portion 10c is formed with an opening 13 for lever portions for housing the upper ends 3a of the pair of the opening and closing lever portions inside with the lower ends thereof left exposed to the outside.

Case lid 11 is formed into an L-shape and is mounted so as to overlap the front and rear wall portion 10b and the bottom wall portion 10d of the case body by using the fixing screw 15. By attaching this case lid 11, the access opening 12 formed in the front and rear wall portion 10b will be blocked.

In addition, front and rear wall portion 10b of the case body 10 is formed for two guide ribs 16 projecting outwardly to extend along the vertical direction. The case lid 11 is superimposed on the front and rear wall portion 10b and sandwiched between the two guide ribs 16. Therefore, even with a single fastening screw 15, without rotation or displacement, the case lid 11 may be attached reliably.

The cylinder case 6 is of a rectangular cross section tube shaped slightly smaller in size than the case body 5, and, as shown in FIG. 2, is formed such that a rod portion 2 penetrates inside. Moreover, this cylinder case 6 is connected to ceiling wall portion 10a by two fixing screws 17 while overlapping on the top wall or ceiling portion 10a. Thus, cylinder case 6 and case body 5 are fixed integrally.

Inside the cylinder case 6, a bottom cover 20 and a cover 21 are mounted respectively to seal the inner portion while supporting the vertically movable rod 2. The internal space inside cylinder case 6 surrounded by both covers 20, 21 functions as a sealed cylinder chamber. In addition, as shown in FIGS. 2 and 3, cylinder case 6 is formed with tow communication passages 22 and 23 for communicating the internal space acting as cylinder chamber and the external. The two communication passages are supplied to the inside space with air with a predetermined pressure together with air drive source 24 for exiting air from the interior space.

At the top of the cylinder case 6, as shown in FIGS. 1 and 2, a pedestal block 25 is superimposed which covers the entire top of the cylinder case while vertically movable supporting rod portion 2.

On this pedestal block 25, a coupling tube 7 is superimposed, which is comprised of a cylindrical portion 7a with top end and a flange portion 7b continuously connected to the lower end of the cylindrical portion 7a and is configured to cover the entirety of the pedestal block 25. Both flange 7b and pedestal block 25 are connected to cylinder case 6 through two common fixing screws 26. Thus cylinder case 6 and pedestal block 25 are fixed in an integrated manner.

On the other hand, the cylindrical portion 7a is fitted with coil spring 30. Further, cylindrical portion 7a is inserted in the mounting hole formed in the movable frame F from the lower side. In this case, cylindrical portion 7a is inserted to the extent at which the top with an annular groove portion 7c will protrude upwardly above movable frame F while compressing the coil spring 30 between the movable frame F and flange portion 7b, Then, after a washer 31 is fitted into the cylindrical portion 7a which protrudes above the moving frame F, retaining ring 32 is attached to the annular groove portion 7c. Thus, a gripping device is fixed to movable frame F through the coupling tube 7 to be suspended therefrom.

The rod portion 2 is disposed so as to penetrate in the vertical direction of the cylinder case 6 along the rod axis O as described above and the lower ends are stored inside the case body 5 while the upper ends stored in the cylindrical portion 7a of coupling tube 7. To the middle part of rod portion 2 in the internal space of the cylinder case 6 is connected an annular piston wall section 40 extending radially outward of the rod portion 2. Then, the internal space of the cylinder case 6 is divided by this piston wall section 40 into a room R1 communicative with a communication passage 22 and room F2 communicative with the other communication passage 23.

This configuration makes it possible, when air driving source 24 supply or discharge air to and from these two rooms R1, R2, due to an internal pressure difference between the two rooms R1, R2, piston wall section 40 is supposed to move vertically. Therefore, in response to movement of piston wall section 40, rod portion 20 may be made movable vertically.

To the lower end of the rod portion 2 is fixed a connecting block 41 as shown in FIGS. 1 and 2. This connecting block is of a block of rectangular shape, and its four side surfaces are disposed in perpendicular to fore-to-aft axis L2 and left-right axis L1, respectively.

In addition, the upper end of the rod 2 accommodated in cylindrical portion 7$a$ of the coupling tube 7 is fixed with end member 42 of disc-shaped and extending radially outward of rod portion 2. Moreover, coil spring 43 is fitted on rod portion 2 so as to be stored between the end member 42 and pedestal block 26.

The coil spring 43 then biases rod portion 2 toward the upper direction by the elastic force of its own. Thus, rod section 2 is designed to move upward at all times. In this embodiment, configuration is made and, when rod portion 2 moves downward, the lower ends 3$b$ of the pair of opening and closing lever portions 3 are space apart for a open state while, when rod portion 2 moves upward, the lower ends 3$b$ of the pair of opening and closing lever portions 3 come closer to assume a closed state. This point will be detailed below. Accordingly, the present embodiment is designed by urging by the coil spring 43, to operate the opening and closing lever portion 3 to be integrally closed at all times.

In other words, coil spring 43 acts as a biasing member and urge rod portion 2 along rod axis O so that rod portion 2 will be moved toward such direction (upward), so as to have the lower ends 3$b$ of the pair of opening and closing lever portion 3 come closer to each other.

Figure 5:
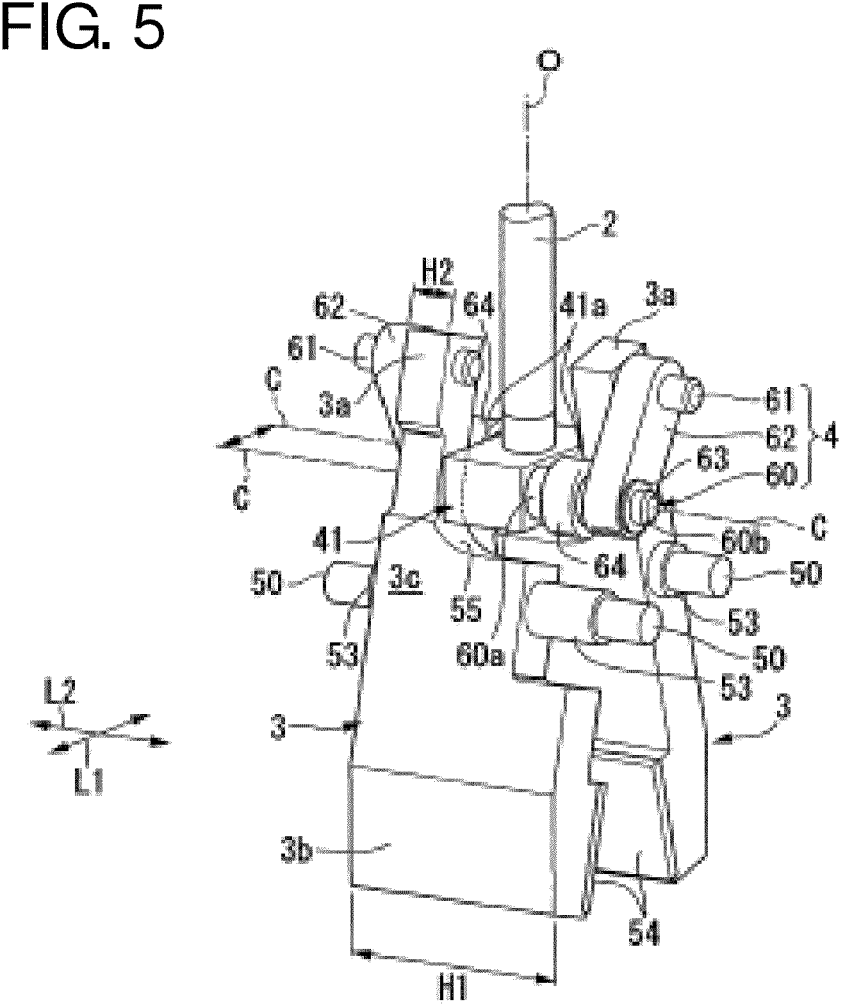
FIG. 5 is a perspective view of FIG. 4 with case and cylinder case removed state.

A pair of opening and closing lever portions 3 is formed, as shown in FIGS. 2 to 5, in a substantially flat plate shape, and is disposed to face each other along the direction of left-right axis L1. In addition, FIG. 5 is a perspective view of a state in which case body 5 and cylinder case 6 are removed from the state shown in FIG. 4.

In this case, the opening and closing lever sections are constructed with its upper end 3$a$ being inserted through opening 13 of lever section of case body 5 and stored inside of case body 5 for accommodation inside while the lower ends 3$b$ exposed outside of case body 5.

In addition, the intermediate portion 3$c$ of the opening and closing lever portion 3 is supported on a fulcrum shaft portion 50 extending in parallel to the fore-to-aft axis L2, an the upper ends 3$a$ and lower ends 3$b$ are made pivotal about this fulcrum shaft portion 50 in the left-right axis L1 direction.

The fulcrum shaft portion 50 is inserted into a through hole (not shown) formed in the intermediate portion 3$c$ of the opening and closing lever portion 3, in the direction of fore-to-aft or longitudinal axis L2, and runs through the intermediate section 3$c$. Then, both ends of the fulcrum shaft portion 50 are inserted into the support hole 51 formed in the bottom wall portion 10$d$ of the case body 10. That is, the opening and closing lever portion 3 is attached to the case body 5 through this fulcrum shaft portion 50.

In addition, the above-mentioned support hole 51 passes through the case body 10 along the fore-to-aft or longitudinal axis L2 and opens into opening 13 for lever portions and front and rear wall portion 10$b$, respectively. Therefore, after removing the lid case 11, fulcrum shaft portion 50 may be inserted from the outside of the case body 50 for easy connection between case body 10 and the opening and closing lever portions 3. Moreover, by attaching case lid 11, the front and rear wall portion 10$b$ of case body 10 may be blocked so that fear is not encountered that the fulcrum shaft portion 50 would fall out.

In addition, a cylindrical space 53 is fitted around this fulcrum shaft portion 50 so as to be interposed between the intermediate portion 3$c$ of the opening and closing lever portion 3 and case body 10. Thus, the opening and closing lever portion 3 is restrained from moving in the fore-to-aft axis direction L2 along the fulcrum shaft portion 50.

The lower end 3$b$ of the opening and closing lever portion is a portion that acts as a claw portion for gripping the work piece W, as shown in FIG. 1. The surface opposing the counterpart of the opening and closing lever portions represents a grip surface with adhesive attached with an elastic sheet 54 consisting of an elastic material such as rubber and the like. This suppresses occurrence of scratches and the like on a work piece W while allowing gripping of the work piece W.

In addition, the opening and closing lever portion 3 of the present embodiment, as shown in FIG. 5, is formed with a large cutout or notch 55 extending from upper end portion 3$a$ leading to intermediate portion 3$c$. Thus, the width along the direction of fore-to-aft or longitudinal axis L2 is formed in such a way that in terms of the width along the fore-to-aft axis L2 direction the width H2 at the upper end 3$a$ is approximately one fourth of the width (H1) at the lower end 3$b$.

In addition, the pair of opening and closing lever portions 3 is disposed to face to each other in the direction of left-right axis L1 with rod portion 2 and connecting block 41 stored or placed into a space created by this cutout 55, and each upper end 3$a$ is positioned on both sides of rod portion 2 and connecting block 41 along the direction of the fore-to-aft axis L2.

Figure 6:
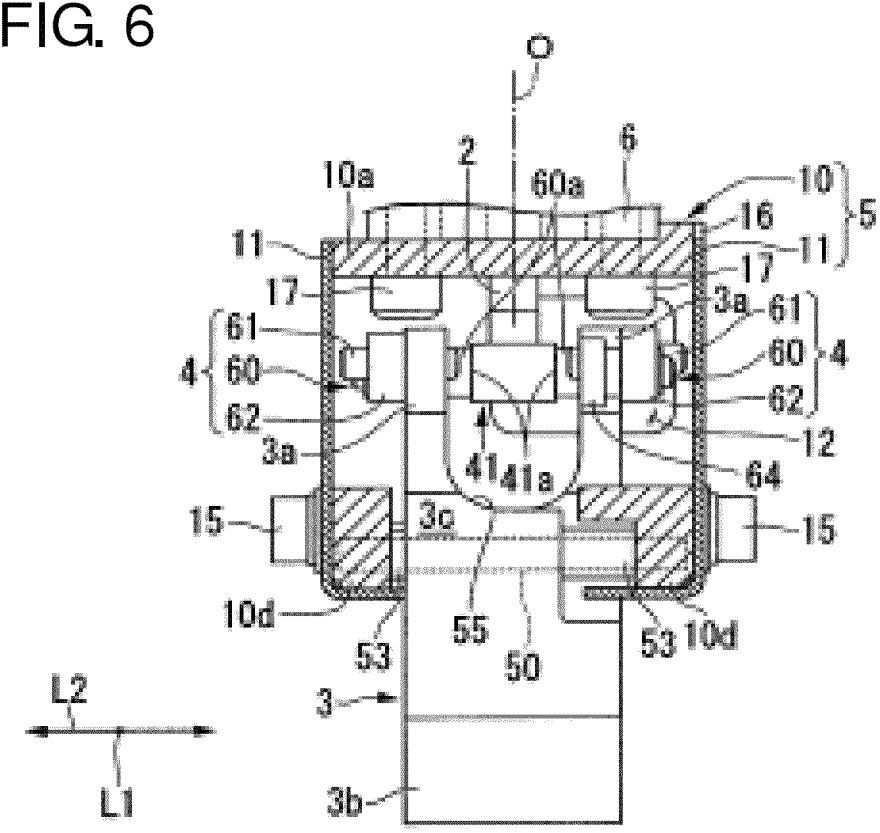
FIG. 6 is a diagram showing a state of FIG. 2 with the rod portion moved upward and opening and closing lever portions in closed state.
Figure 7:
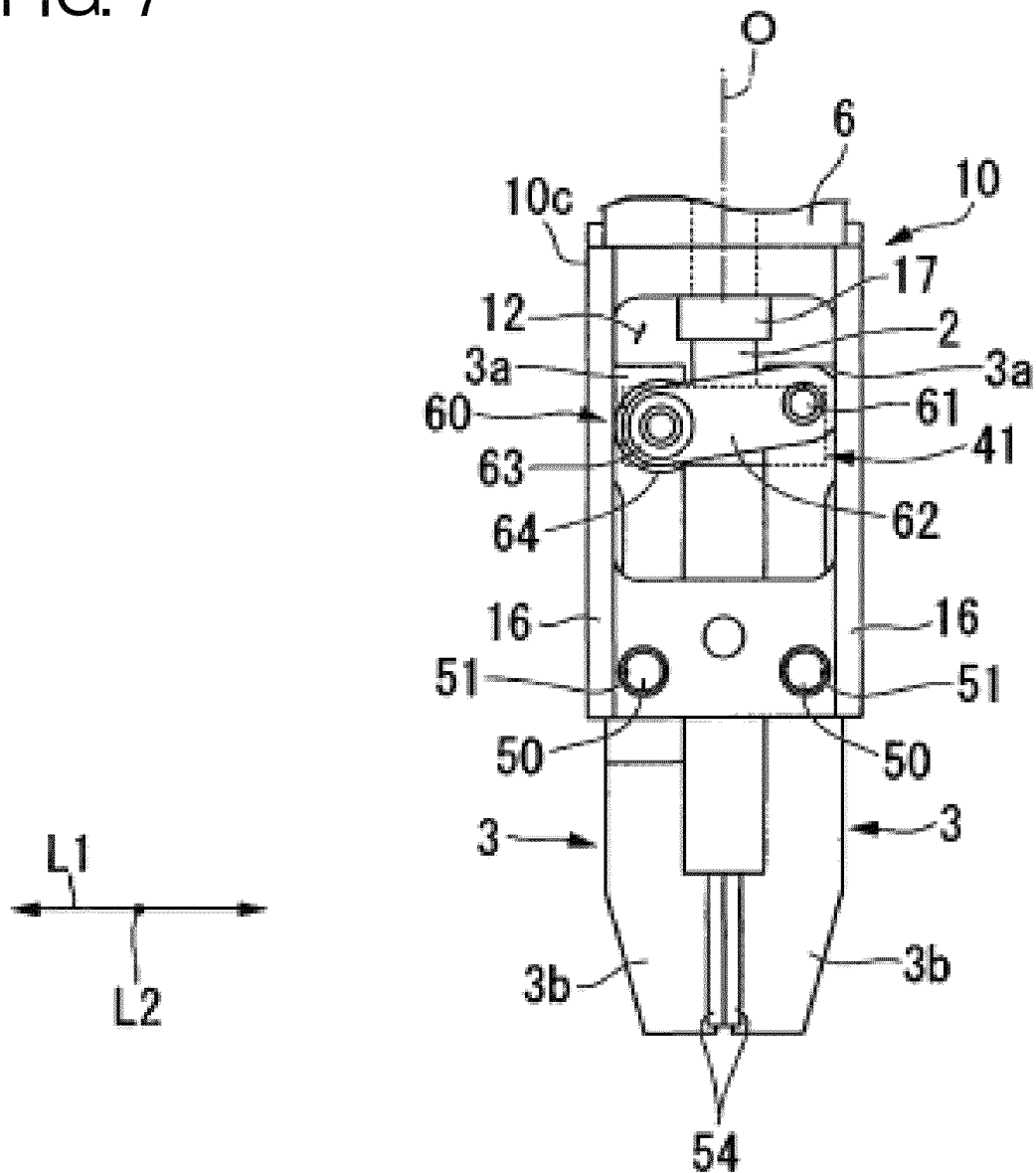
FIG. 7 is a diagram showing a state of FIG. 3 with the rod portion moved upward and opening and closing lever portions in closed state.
Figure 8:
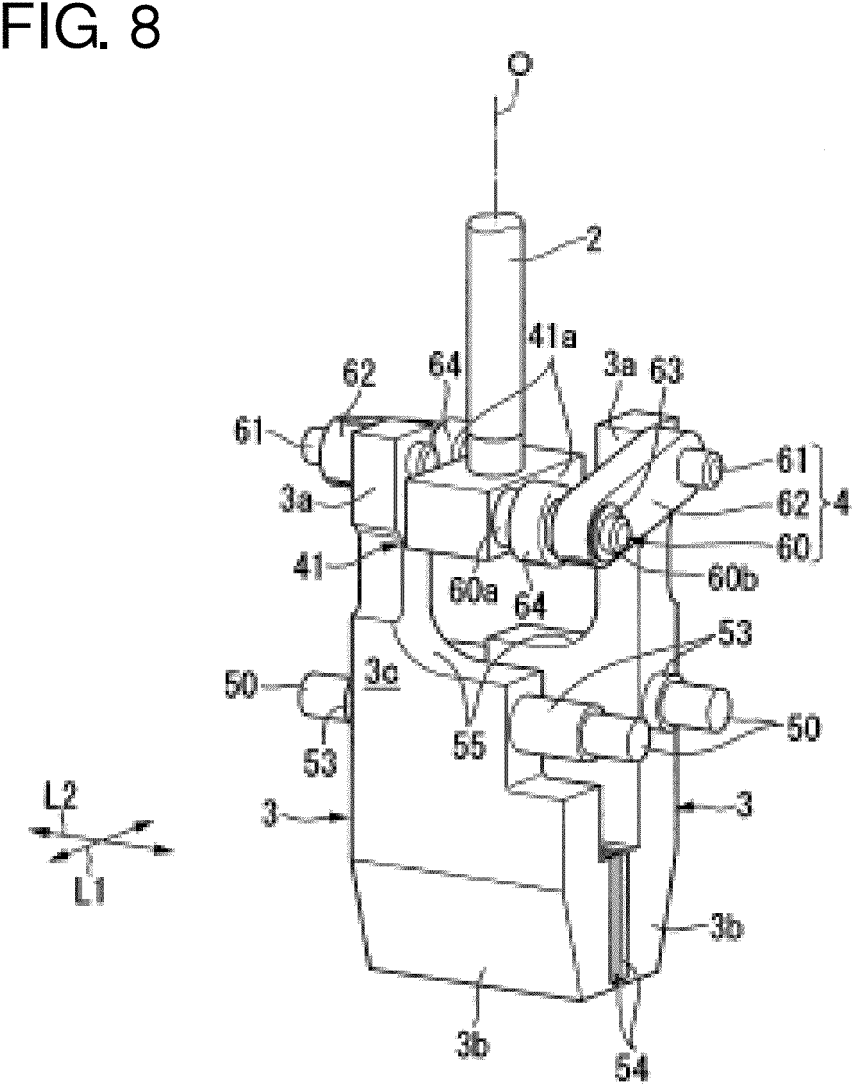
FIG. 8 is a diagram showing a state of FIG. 5 with the rod portion moved upward and the opening and closing lever portions in closed state.

The link mechanism 4, as shown in FIG. 5, connects connecting block 41 and the upper end of opening and closing lever portion 3$a$1, and plays a role to swing or pivot the opening and closing lever portion 3 in the left-right axis direction in order for the lower ends 3$b$ of the opening and closing lever portions 3 mutually approach or separate from each other. In addition, in the link mechanism 4 according to the present embodiment, when rod portion 2 moves downward, as shown in FIGS. 2 to 5, the opening and closing lever portions 9 is swung to make the lower ends 3 separated apart to assume an open state. When rod portion 2 moves upward, as shown in FIGS. 6 to 8, the opening and closing lever portion 3 may be tilted so that the lower ends 3$b$ come closer to assume a closed state.

Link mechanism 4, as shown in FIG. 2, FIG. 3 and FIG. 5, is composed of a first connecting pin 60 provided on connecting block 41, a second connecting pin 61 provided on the upper end 3$a$ of the opening and closing lever portion 3, and a link piece to establish a linkage between the upper end 3$a$ of the opening and closing lever portion 3 and the connecting block 41 via those first and second connecting pins 60 and 61.

The first connecting pin 60 is configured to protrude along the fore-to-aft axis L2 from the opposing surface 41$a$ (plane perpendicular to the direction of fore-to-aft or longitudinal axis L2) of respective upper end 3$a$ of the pair of opening and closing lever portions 3. In this case, the two first connecting pins 60 are equidistantly separated in the opposite directions from the rod axis O on the opposing surface 41$a$ of connecting block 41 along the left-right axis L1 so that the first connecting pins are spaced apart in the left-right direction L1 and the center lines C are disposed in non-coaxial relationship to each other The first connecting pin 60 is formed as a stepped diameter pin with its diameter being different in the middle so that a large-diameter portion 60$a$ at the root side and a small-diameter portion 60$b$ at the front end side are formed respectively. To the small-diameter portion 60$b$ is connected rotatably an end of link piece 62. Note that the tip portion of small-diameter portion 60$b$ protruding outwardly from link piece 62 is formed with an annular groove (not shown), and this annular groove is used for attaching a retaining ring 63. Link piece 62 is held not detachable from first connecting pin 60 by this retaining ring 63.

The large-diameter portion 60a of the first connecting pin 60 is fitted with a rolling bearing 64 such as ball bearing. The rolling bearing portion 64 is constructed in such a way that the outer ring comes to contact with the inner wall of case body 10, as shown in FIG. 3.

Thus, when connecting block 41 and first connecting pin 60 move vertically in response to the up and down movement of rod portion 2, the outer ring will be brought in contact with the inner wall to slide thereon. Accordingly, the first pin 60 may be guided stably for vertical movement without experiencing jounce or saccadic movement. In addition, at the time of sliding, even if rolling bearing 64 rotates, this does not have any impact on the first connecting pin 60, which is supported at the inner side.

The second connecting pin 61 is configured, as shown in FIG. 5, so as to protrude in an outward direction along the fore-to-aft or longitudinal axis L2 from the upper end portion 3a of the opening and closing lever 3. The distal end of the second connecting pin 61 is expected to move in response to a swivel or pivot of the opening and closing lever 3 while in close proximity to or in contact with the inner surface of case lid 11.

The link piece 62, which is formed in the shape of an ellipse in plan view with a semicircular shape at both ends, is rotatably connected at its one end with the first connecting pin 60 and at the other end to the second connecting pin 61. Thus, link piece 62 establishes a linkage between connecting block 41 and the pair of opening and closing lever portion 3.

One end of the link piece 62 is protected from withdrawal or detaching from the first connecting pin due to the above described retaining ring 63 for falling-off prevention.
In addition, the other end of the link piece 62, which is coupled to the second connecting pin 61, and the distal end of the second connecting pin 61 is in turn in close proximity to or in contact with an inner surface of case lid 11. Thus, the other end of link piece 62 is also free from risk to be withdrawn from the second connecting pin 61.

Next, a description will be given of an operation of gripping device to grip a work piece constructed in this way. Explanation will be made on the assumption that, as the initial state, a pair of the opening and closing lever portions 3 is held in an open state with lower ends 3b separated, as is shown in FIGS. 2 to 5.

First, as shown in FIG. 1, after a work piece W is positioned directly below the gripping device 1, movable frame F is moved downward to be positioned between the lower ends 3b of the pair of opening and closing lever portions 3. Then, along with discharge air from room R1 of one of the internal spaces of the cylinder case 6 by operating air drive section 24, supply of air to room R2 is made such that the internal pressure in the room R1 is made lower than the internal pressure of the other room R2. Then, due to the difference in internal pressure in the two rooms, R1, R2, cylinder wall portion 40 moves upward under a biasing force of coil spring 43. Accordingly, the rod portion 2 and connecting block 41 move upward in response to the movement of cylinder wall portion 40.

When connecting block 41 moves upward, link mechanism 4 will be moved to expand or push upper ends 3a of the pair of opening and closing lever portion 3 in the direction of left-right axis L1 to pivot these opening to closing lever portion 3 in the left-right direction.

As shown in FIGS. 6 to 8, when connecting block 41 moves upward, the first connecting pin 60 is moved upward in response thereto. Then, one end of the link piece 62 moves upward along the rod axis O, the other end rotates about the first connecting pin 60 downwardly. Therefore, the upper ends 3a of the opening and closing lever portions 3 connected to the other end of link piece 62 through second connecting pin 61 move to spread along the left-right axis L1 in response to rotation of ling piece 62.

Since the pair of opening and closing lever portions 3 is supported at its intermediate portion 3c on fulcrum shaft portion 50, the upper end 3a and lower end 3b rotate in a reverse direction to each other about fulcrum shaft portion 50. Therefore, by moving to push the upper ends 3a of the pair of opening and closing lever portions 3, lower ends 3b may be made closer to each other.

This allows the pair of opening and closing lever portions 3 in a close state, and as shown in FIG. 1, to grip the work piece W from both sides using lower ends 3b. In addition, the gripping surface of a pair of opening and closing the lever portion 3 is attached with elastic sheet 54, it is possible to grip the work piece W, etc. without scratching.

Next, a description will be given when releasing the work piece W once grasped or gripped In this instance, along with supply air to room R1 of one of the internal spaces of the cylinder case 6 by operating air drive section 24, discharge of air from room R2 is made such that the internal pressure in the room R1 is made higher than the internal pressure of the other room R2. Then, due to the difference in internal pressure in the two rooms, R1, R2, cylinder wall portion 40 moves downward resisting force of coil spring 43. Accordingly, the upper ends 3a of the pair of opening and closing lever portions 3 are moved or draw close to each other along the direction of left-right axis.

Therefore, by letting the lower end portions 3b spaced apart from each other, an open state of the pair of the opening and closing lever portions 3 is obtained to thereby release the work piece W once gripped. It is possible to release of work piece W by moving movable frame F upward, so that the work piece W released from gripping will be separated from the work piece W, with the procedure completed.

In this way, in a gripping device 1 of the present embodiment, it is possible to grip a work piece W by bringing the pair of opening and closing lever portion 3 in a closed state in response to upward movement of rod portion 2, and the work piece W may be released from gripped state by bringing an open state in response to the downward movement.

Even in the event that air drive portion 24 or unit malfunctions, coil sprig 43 urges rod portion 2 so as for the lower ends 3b of the pair of the opening and closing lever portions 3 to come closer to each other. Accordingly, an inadvertent release of grip of work piece W and falling off thereof will be prevented in advance. Therefore, the reliability of gripping device 1 may be enhanced.

In a gripping device of the present embodiment, although the pair of opening and closing lever portions 3 is disposed to face each other along left-right axis L1, they are not disposed outside of both sides of connecting block 4 leaving a space or interval, but are disposed to face each other with rod portion 2 and connecting block 41 accommodated or stored in a space of notch or cutout 55. Therefore, without being affected by the rod portion 2 and connecting block 41, a pair of opening and closing lever portions 3 is allowed to approach and confront each other as close as possible.

In this case, the upper ends 3a of the pair of opening and closing lever portions 3 are positioned or allocated on both sides of rod portion 2 and connecting block 41 along the fore-to-aft axis L2. Therefore, no interference occurs of the upper ends 3a of the opening and closing lever portions 3 and a reliable pivotal movement of opening and closing lever portions 3 is ensured.

In this way, since a pair of opening and closing lever portions 3 may be disposed as close as possible to each other to face each other along the direction of left-right axis L1, the width of overall device along the opening and closing direction (along direction of left-right axis L1) may be made small to realize a miniaturization. Thus, the device may be installed in a small space and a gripping device with excellent ease of use and convenience may be obtained.

Moreover, in this embodiment, the first connecting pins 60 composing the link mechanism 4 are spaced apart from rod axis O in the opposite direction yet by the same distance along the left-right axis L1, and respective center axes C are separated along the left-right axis L1 in non-coaxial relationship. Therefore, when upper ends 3a of the opening and closing lever portions 3 are linked to connecting block 41 via link piece 62, respective upper ends 3a may be crossed and thus, a pair of opening and closing lever portions 3 may be placed to face each other in extreme proximity. Therefore, the above described size reduction or miniaturization may be more remarkable.

As described above, according to a gripping device of the present embodiment, it is possible to reduce the width along the direction of opening and closing of a pair of the opening and closing lever portions 3 and to install in small spaces. In addition, since the structure which is to open and close the pair of opening and closing lever portions 3 uses toggle mechanism, work piece W can be reliably gripped in the strong force to exhibit fully the function of gripping device, even if the device is of small size.

In addition, in this embodiment, since the link mechanism is configured by a simplified combination of the first connecting pin 60, the second connecting pin 61 and the link piece 62, it is possible to reduce the number of parts and to suppress the high cost.

In addition, the upper ends 3a of a pair of the opening and closing lever portions 3, connecting block 41, link mechanism 4 and the like as components for opening and closing movements of the opening and closing lever portions 3 are enclosed by a case. Therefore, they are less susceptible to direct contact from outside and dust is less likely to adhere. Therefore, it is easy to maintain the reliability of operation over the long term, and to ensure reliable gripping of the work piece.

In addition, the technical scope of the present invention is not limited to the embodiments described above, and various modifications may be added without departing from the spirit and scope of the present invention.

For example, in the above-described embodiment, the link mechanism is configured in such a way that a pair of opening and closing lever portions 3 is brought in an open state when rod portion 2 moves downward while being in a closed state when the rod portion 2 moved upward. This configuration may be reversed. More specifically, it may be configured such that, in response to downward movement of rod portion 2, the pair of opening and closing lever portions 3 may be held in a closed state, and they will be in an open state upon the upward movement.

In any case, link mechanism may be constructed in various ways as long as the lower ends 3b may be opened or closed by pivotal or swing movement of a pair of opening and closing lever portions 3 in response to vertical movement of the rod portion.

The above-described embodiment is an example of gripping work piece W of generally planer shape, but the shape of work piece is not limited to this, and other shapes are applicable as well. In these instances, the shape of the lower ends 3b of opening and closing lever portions 3, more specifically the shape of gripping surface, may be changed depending on a specific work piece W. For example, a gripping surface may be formed with a V-shaped cross section, step, recess and the like.

In addition, in the above-described embodiment, the first connecting pins 60 are located to be shifted to each other with an interval along the left-right axis L1, but the respective axes may be located co-axially. Even in this configuration, work piece W may be gripped in the same manner.

However, it is preferable for the shifted arrangement of the first connecting pins 60 in that a pair of opening and closing lever portions 3 may be placed along the left-right axis L1 to face each other closer as the extent to which the upper ends 3a crosses.

In addition, in the embodiment described above, although an air supply to and discharge from two rooms R1, R2 partitioned in cylinder case 6 give rise to internal pressure difference that is used for vertical movement of rod portion 2, no limit is intended by this configuration. Any configuration may be used as long as rod portion 2 may be moved vertically.

In addition, in the above-described embodiment, only a single gripping device 1 is suspended to movable frame F, however, a plurality of gripping devices may be disposed along the direction of left-right axis L1. Due to this configuration, more than one work piece W may be gripped at a time.

In particular, in the gripping device 1 of the present embodiment, because it is made compact with a small width of the entire device along the opening and closing direction (left-right axis L1), even if multiple gripping devices are to be arranged in parallel, a large installation space will not be required. Therefore, it is possible to achieve the effective utilization of space.

The invention claimed is:

1. A gripping device for gripping a workpiece on both sides thereof comprising:
    a rod portion movable vertically along a rod axis and having an upper end and a lower end;
    connecting block mounted to the lower end of the rod portion;
    a pair of opening and closing lever portions disposed to face each other along a left-right axis perpendicular to the rod axis, wherein each of the pair of opening and closing lever portions is supported by a fulcrum axis at an intermediate portion thereof, and both an upper end and a lower end thereof are configured to pivot in a left-right direction about the furculum axis disposed parallel to a fore-to-aft axis which is perpendicular to both the rod axis and the left-right axis;
    a link mechanism connecting the connecting block to the upper end of the pair of opening and closing lever portions, allowing the pair of opening and closing lever portions to pivot in the left-right direction so that the lower end of the pair of opening and closing levers portions move farther apart or come closer to each other in response to vertical movement of the rod portion;
    a cutout portion formed in the pair of opening and closing lever portions, at least a part of the cutout portion extending from an intermediate portion to the upper end, the pair of opening and closing lever portions disposed to face each other when the rod portion and the connecting block are stored within the cutout portion, and the upper end of the pair of opening and closing lever portions are disposed on both sides of the rod portion and connecting block portion along the fore-to-aft axis;

first connecting pins protruding parallel to the fore-to-aft axis from surfaces of the connecting block opposing the upper end of the pair of opening and closing lever portions;

second connecting pins protruding parallel to the fore-to-aft axis from the upper end of the pair of opening and closing lever portions; and a link piece having a first end rotatably connected to the first connecting pins and a second end rotatably connected to the second connecting pins for establishing a linkage between the connecting block and the pair of opening and closing lever portions.

2. The gripping device as claimed in claim 1, wherein the first connecting pins are equidistantly separated in opposite directions from the rod axis on an opposing surface along the left-right axis so that the first connecting pins are spaced apart in the left-right direction and center axes of the first connecting pins are disposed non-coaxially to each other.

3. The gripping device as claimed in claim 1, further comprising:

a biasing member configured to urge the rod portion along the rod axis so that the rod portion will be moved to allow the lower end of the pair of the opening and closing lever portions to come closer to each other.

4. The gripping device as claimed in claim 1, further comprising:

a case surrounding the connecting block and the link mechanism at least from a periphery, wherein the pair of opening and closing lever portions is mounted to a body of the case through the fulcrum shaft portion and the upper end of the pair of opening and closing lever portions is housed inside the case while the lower end is exposed outside the case body.

* * * * *